(12) United States Patent
Böhm et al.

(10) Patent No.: US 9,145,071 B2
(45) Date of Patent: Sep. 29, 2015

(54) VEHICLE SEAT, IN PARTICULAR MOTOR VEHICLE SEAT

(75) Inventors: Andre Böhm, Kaiserslautern (DE); Ralph Recktenwald, Freisen (DE)

(73) Assignee: KEIPER GmbH & Co. KG, Kaiserslautern (DE)

(*) Notice: Subject to any disclaimer, the term of this patent is extended or adjusted under 35 U.S.C. 154(b) by 0 days.

(21) Appl. No.: 14/117,130

(22) PCT Filed: Apr. 18, 2012

(86) PCT No.: PCT/EP2012/057078
§ 371 (c)(1),
(2), (4) Date: Nov. 12, 2013

(87) PCT Pub. No.: WO2012/152553
PCT Pub. Date: Nov. 15, 2012

(65) Prior Publication Data
US 2014/0312670 A1    Oct. 23, 2014

(30) Foreign Application Priority Data
May 12, 2011  (DE) .................... 10 2011 101 879

(51) Int. Cl.
*B60N 2/36* (2006.01)
*B60N 2/22* (2006.01)
*B60N 2/30* (2006.01)

(52) U.S. Cl.
CPC ............... *B60N 2/22* (2013.01); *B60N 2/3031* (2013.01); *B60N 2/3065* (2013.01); *B60N 2/36* (2013.01)

(58) Field of Classification Search
CPC .................................. B60N 2/206; B60N 2/36
USPC .......... 297/15, 354.12, 354.13, 378.1, 378.12
See application file for complete search history.

(56) References Cited

U.S. PATENT DOCUMENTS

| | | | | |
|---|---|---|---|---|
| 5,211,445 | A * | 5/1993 | Husted et al. | 297/378.12 |
| 6,464,297 | B2 * | 10/2002 | Garrido et al. | 297/354.13 |
| 7,172,252 | B2 * | 2/2007 | Henning | 297/354.13 |
| 7,628,449 | B2 * | 12/2009 | Harth | 297/15 |
| 2003/0056329 | A1 * | 3/2003 | Coman et al. | 16/343 |
| 2004/0113480 | A1 * | 6/2004 | Reed et al. | 297/408 |
| 2005/0146188 | A1 * | 7/2005 | Nichilo | 297/378.1 |
| 2005/0212341 | A1 * | 9/2005 | Coughlin et al. | 297/378.12 |

(Continued)

FOREIGN PATENT DOCUMENTS

| | | |
|---|---|---|
| DE | 100 48 127 A1 | 4/2002 |
| DE | 203 02 007 U1 | 4/2003 |
| DE | 10 2004 014 605 B3 | 10/2005 |

(Continued)

*Primary Examiner* — Peter Brown
(74) *Attorney, Agent, or Firm* — McGlew and Tuttle, P.C.

(57) ABSTRACT

A vehicle seat, in particular to a motor vehicle seat, having a base structure (3) that is to be connected to the vehicle structure (S) and a backrest (10) that can be moved relative to the base structure (3) by kinematics, such as to transfer the vehicle seat (1) from at least one usage position allowing a person to sit down to a non-usage position or to another usage position. A multi-bar linkage, in particular a four-bar linkage (V), exists at least temporarily, which linkage controls the kinematics. A leaf spring (30) is provided in the vehicle seat. The leaf spring forms a gear element of the multi-bar linkage in the relaxed extended state thereof.

18 Claims, 5 Drawing Sheets

(56) References Cited

U.S. PATENT DOCUMENTS

| | | |
|---|---|---|
| 2006/0103175 A1* | 5/2006 | Fourrey et al. .................. 297/15 |
| 2006/0145524 A1* | 7/2006 | Fischer et al. ............ 297/378.12 |
| 2011/0316317 A1* | 12/2011 | Sprenger et al. ........... 297/344.1 |
| 2012/0169105 A1 | 7/2012 | Assmann et al. |

FOREIGN PATENT DOCUMENTS

| | | |
|---|---|---|
| DE | 10 2008 012 714 B3 | 10/2009 |
| DE | 20 2009 016 989 U1 | 4/2010 |
| JP | 2006-198112 A | 8/2006 |
| WO | 2007/006440 A2 | 1/2007 |

* cited by examiner

VEHICLE SEAT, IN PARTICULAR MOTOR VEHICLE SEAT

CROSS REFERENCE TO RELATED APPLICATIONS

This application is a United States National Phase Application of International Application PCT/EP2012/057078 filed Apr. 18, 2012 and claims the benefit of priority under 35 U.S.C. §119 of German Patent Application DE 10 2011 101 879.8 filed May 12, 2011, the entire contents of which are incorporated herein by reference.

FIELD OF THE INVENTION

The invention relates to a vehicle seat, in particular a motor vehicle seat having a base structure connected to the vehicle structure and a backrest which can be moved relative to the base structure by means of a kinematic system, wherein the vehicle seat can be moved from at least one position for use in which it is possible to be seated, into a non-use position or into another position for use, wherein a multi-bar mechanism, in particular a four-bar mechanism, exists at least temporarily and controls the kinematic system.

BACKGROUND OF THE INVENTION

A vehicle seat of the type mentioned in the introduction is known from DE 10 2008 012 714 B3. At both vehicle seat sides, the backrest has a backrest carrier which is articulated to the base structure so as to be able to be locked by means of a fitting, and a backrest structure, which is articulated to the associated backrest carrier by means of an articulation at each of the two vehicle seat sides and which can be locked to the backrest carrier by means of a locking device. At one vehicle seat side, a resilient unit is provided, comprising a pneumatic spring and an end stop for the pneumatic spring. The resilient unit is articulated to the base structure in a manner offset from the fitting and articulated to an arm of the backrest structure in a manner offset from the articulation.

The transition from the position for use into the non-use position is carried out by unlocking and pivoting the backrest structure in a forward direction and the backrest carrier in a backward direction. The pivoting backrest structure defines a pivot angle (relative to the backrest carrier). If the backrest structure reaches a specific pivot angle range, the resilient unit reaches the end stop thereof, so that the articulation locations of the resilient unit which is located in the end stop (and which thus forms a gear member), the articulation and the fitting temporarily define a four-bar mechanism which controls the kinematic system comprising the backrest carrier and the backrest structure, as long as the backrest structure is located in the specific pivot angle range. In the end phase of the transition into the non-use position, the temporary four-bar mechanism is neutralized again, and the kinematic system functions particularly as an uncontrolled two-bar mechanism.

DE 10 2004 014 605 B3 also discloses a vehicle seat which can be moved from a position for use into a non-use position. In this instance, there is provided in order to support this movement a compensation spring which is constructed, for example, as a leaf spring.

SUMMARY OF THE INVENTION

An object of the invention is to improve a vehicle seat of the type mentioned in the introduction with respect to the prior art and to construct it in a more cost-effective manner.

The kinematic system of the backrest is controlled by means of the multi-bar mechanism which exists temporarily. During this phase of the existence of the multi-bar mechanism, only one degree of freedom is provided, that is to say, there is a defined transition, preferably into the non-use position. The use of a leaf spring as a gear member of this multi-bar mechanism is more cost-effective with respect to a pneumatic pressure spring. The use of a multi-bar mechanism for controlling a kinematic system is not limited to the transition into a non-use position. It is also conceivable to control therewith another movement of the backrest, for example, an inclination adjustment, or a height adjustment or an inclination adjustment of the seat cushion structure. The term "control" is intended to be interpreted in a broad sense so that the multi-bar mechanism may also comprise portions of the backrest or may carry them.

The leaf spring functions in the relaxed extended position thereof as a tension coupling, that is to say, it is subjected to tensile loading. When the extended position, for example, owing to geometry, has to be left, the leaf spring bends and the temporary four-bar mechanism is neutralized. In the bent positions thereof, the leaf spring builds up tension, as a result of which it can act as a pressure spring, for example, in order to counteract the gravitational force of the backrest, in the same manner as a backrest compensation spring which is preferably available in addition. A specific length of the leaf spring enables the formation of adequate tension, even in the case of small curvatures of the leaf spring, that is to say, there is a small structural spatial requirement.

In the non-use position, the backrest structure is preferably formed on a front support, which is preferably formed on the base structure and laid on a rear support which is preferably constructed on the vehicle structure. In addition to improved introduction of force when the vehicle seat is loaded in the non-use position, it is consequently possible, when returning from the non-use position, into the position for use, for the lower backrest edge to slide along a guiding path (adjacent to the rear support) on the vehicle structure so that again only one degree of freedom is available for the kinematic system.

The vehicle seat according to the invention is similar in terms of several embodiment features to the vehicle seats described in DE 10 2008 012 714 B3 and in WO 2007/006440 A2 as a second embodiment, for which reason the content thereof is expressly incorporated herein by reference.

It is thus possible, when moving from the position for use into the non-use position, when the unlocked backrest structure pivots forward and the backrest carrier which is unlocked in a force-controlled manner by the backrest structure pivots backward, to achieve a non-use position (base position) which is lower with respect to a table position and which is suitable for loading, in contrast to a reclining position. A seat cushion structure preferably pivots forward through slightly more than 180°, with the original lower side of the seat cushion structure then adjoining in a more or less flush and planar manner the original rear side of the backrest structure which is located therebehind in the non-use position.

A force-controlled unlocking of the fitting simplifies the actuation which is intended to be carried out by the user in that he has, for example, only to unlock the locking device of the backrest structure, whilst the backrest structure carries out the unlocking of the backrest carrier, that is to say, acts on the fitting. The backrest structure preferably unlocks the fitting by means of a coupling, which is preferably constructed in a rigid manner. For a specific temporal movement sequence, the coupling may provide for a non-loaded path, for example, a tongue and groove guide, by means of which the force-controlled unlocking can be delayed and can be adjusted to a specific pivot angle range of the backrest structure.

There is preferably provided at each vehicle seat side precisely one backrest carrier, for example, in the form of a crank, the two backrest carriers being able to be coupled by means of transverse connections. This stabilizes the backrest for normal use and in the event of a crash. The springs or gear connections provided for the transition between the position for use and the non-use position need to be provided only at one vehicle seat side, preferably at different vehicle seat sides. The leaf spring which is provided to act on the movement of the backrest structure can thus contribute to the compensation for the backrest weight in the event of an inclination adjustment.

The leaf spring is also suitable for vehicle seats having a kinematic system other than that described.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
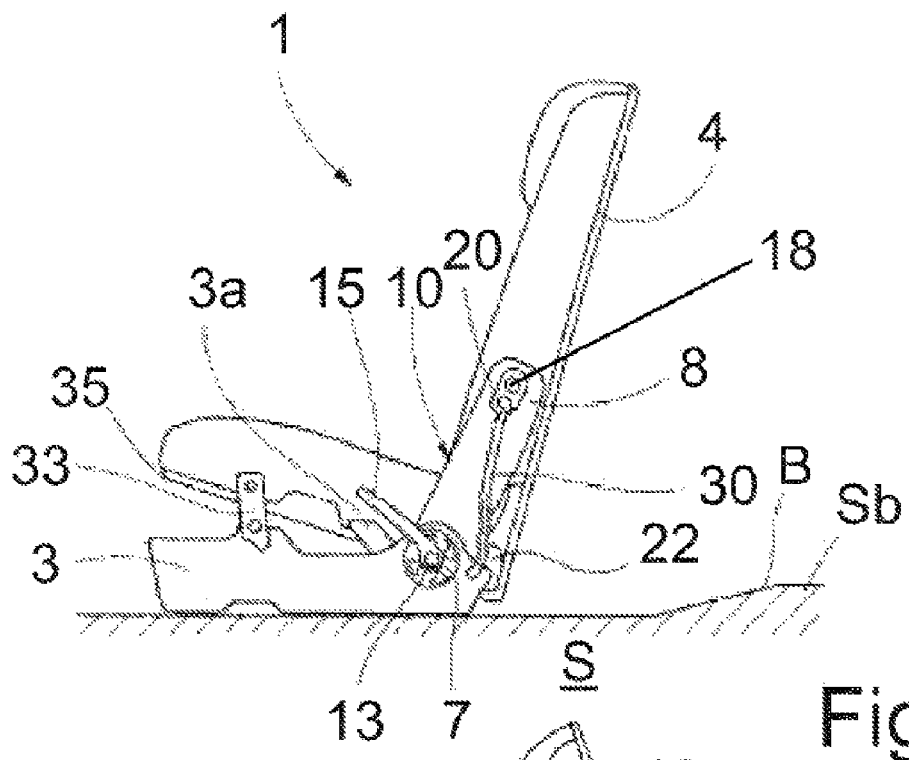
FIG. 1 is a left-hand side view of the embodiment according to the invention in the position for use.

Referring to the drawings in particular, in the embodiment, a vehicle seat 1 is provided for a rear, in particular third, seat row of a motor vehicle, the arrangement of the vehicle seat 1 inside the motor vehicle and the conventional travel direction thereof defining the directional indications used below. The vehicle seat 1 has components of its carrying structure in the form of a base structure 3 and a backrest structure 4 which is upholstered in a manner known per se. The base structure 3 in this instance is securely connected to the vehicle structure S of the motor vehicle, but could also be adjustable relative to the vehicle structure S in terms of length by means of seat rails. Furthermore, the base structure 3 may be constructed so as to be articulated per se. At each of the two vehicle seat sides, there is provided on the base structure 3 a fitting 7, by means of which a backrest carrier 8 which is constructed as a crank is fitted so as to be able to be pivoted and locked relative to the base structure 3. The two backrest carriers 8 together define with the upholstered backrest structure 4 the backrest 10 of the vehicle seat 1. A position for use of the vehicle seat 1 in which it is possible to be seated is first described.

The fitting 7 is constructed in this instance as a catch fitting, as described, for example, in DE 20 2009 016 989 U1, the content of which is expressly incorporated herein by reference. In this instance, one of the two fitting members is securely connected to the base structure 3 at the rear end thereof and the other fitting member is securely connected to the backrest carrier 8 at the lower end thereof. However, it is also possible to use as a fitting 7 a gear fitting having a pivoting release function, as described, for example, in DE 100 48 127 A1, the content of which is also expressly incorporated herein by reference.

The fitting 7 which is normally locked can be unlocked by means of a first actuation element 11 by the first actuation element 11, which is in this instance in the form of a slotted metal sheet, rotating a shaft 13. There may be provided for each fitting 7 a shaft 13 or for both fittings 7 a common shaft 13, which couples the two fittings 7 and enables synchronous unlocking by means of a single first actuation element 11. The first actuation element 11 is arranged in this instance at the vehicle seat side which is located closer to the vehicle interior and which is referred to briefly as the inner side of the vehicle seat 1. The shaft 13 is in alignment with the rotation axis of the fittings 7, that is to say, the pivot axis of the backrest carrier 8 relative to the base structure 3.

For an inclination adjustment of the backrest 10, the fitting 7 (in the construction as a catch fitting) can be unlocked by means of a second actuation element 15 which is in this instance in the form of a lever handle. The second actuation element 15 may be connected to the first actuation element 11 in a rotationally secure manner, but acts in this instance directly on the shaft 13, wherein it is possible to provide for carrying or decoupling in a rotation direction. The second actuation element 15 is arranged in this instance at the vehicle seat side which is located closer to the vehicle exterior and which is referred to briefly as the outer side of the vehicle seat 1. In a modified embodiment, no separate second actuation element 15 is provided and, for the inclination adjustment of the backrest 10, the fitting 7 is instead, for example, actuated by means of the first actuation element 11.

A backrest compensation spring 17, which is constructed in this instance as a pneumatic spring and which is arranged, for example, at the inner side of the vehicle seat 1, acts between the base structure 3 and the backrest carrier 8. In the case of fittings 7 which are unlocked, the backrest compensation spring 17 compensates for at least a portion of the weight of the entire backrest. The backrest compensation spring 17 thus acts in the forward pivoting direction of the backrest.

The backrest structure 4 is articulated to the backrest carrier 8 at both vehicle seat sides by means of an articulation 18 which is in the form of a rotary bearing. The articulation 18 is provided between the upper end of the backrest carrier 8 and the backrest structure 4 in the lower half thereof. The rotation axes defined by the articulations 18 are in alignment with each other and define the pivot axis of the backrest structure 4 relative to the backrest carriers 8. The rear side of the backrest structure 4 faces substantially toward the rear in the position for use, in a slightly oblique manner with respect to the horizontal. The articulations 18 are constructed in such a manner that there is provided in each case a central articulation pin which is connected to the backrest structure 4 in a rotationally secure manner. One arm 20 is fitted to this articulation pin—in a state axially offset with respect to the associated backrest carrier 8 at the outer side, respectively. The two arms 20 are consequently connected to the backrest structure 4 in a rotationally secure manner.

In the region of the lower end of the backrest structure 4, a locking device 22 is provided at least at one vehicle seat side, in this instance at both sides. The locking device 22 is constructed in this instance as a lock, as described, for example, in DE 203 02 007 U1, the content of which is expressly incorporated herein by reference. Using this locking device 22 on the backrest structure 4, the backrest structure 4 is releasably locked to the associated backrest carrier 8, in more specific terms to a counter-element on the associated backrest carrier 8, in this instance a curved locking member of the backrest carrier 8, the locking device 22 and counter-element being able to be transposed in terms of their positions. The backrest 10 thereby forms a kinematic unit in the position for use. Using the fittings 7, a plurality of positions for use of this kinematic unit can be adjusted, that is to say, the backrest 10, in particular the backrest structure 4, can be adjusted in terms of inclination. In place of the combination comprising the articulation 18 and locking device 22, a fitting in the manner of the fitting 7 may also be provided.

At one vehicle seat side, in this instance the vehicle seat side having the backrest compensation spring 17, that is to say, the inner side of the vehicle seat 1, a coupling 26 is articulated to the arm 20 with one of the two ends thereof. At the other end thereof, the coupling 26 is articulated to the first actuation element 11 by means of a tongue and groove guide 28, the coupling 26 in this instance having the tongue and the first actuation element 11 having the groove. The transposed association is also possible. Furthermore, at one vehicle seat side, in this instance the vehicle seat side located opposite the backrest compensation spring 17, that is to say, the outer side of the vehicle seat 1, a leaf spring 30 is provided. The leaf spring 30 is fitted, on the one hand, to the base structure 3, in a state offset with respect to the fitting 7, and consequently offset relative to the pivot axis of the backrest carrier 8 and, on the other hand, on the arm 20 provided at this vehicle seat side, that is to say, offset with respect to the articulation 18 and consequently offset with respect to the pivot axis of the backrest structure 4, preferably in each case with the end portion thereof rotatably on a pin. The leaf spring 30 is relaxed in the extended position thereof and forms tension during bending so that it can then act as a pressure spring. The backrest compensation spring 17, coupling 26 and leaf spring 30 are provided in this instance at precisely one vehicle seat side but may also be provided at both vehicle seat sides.

A crank 33 is articulated to each of the two vehicle seat sides with one end. The other end of each crank 33 is articulated to a seat cushion structure 35, which is upholstered in a manner known per se. The mutually corresponding articulations at both vehicle seat sides are in alignment with each other. Instead of an articulation by means of the cranks 33 and the two pivot axes thereof, in a modified embodiment the seat cushion structure 35 may be directly articulated to the base structure 3, that is to say, by means of a single pivot shaft which is defined by means of two mutually aligned articulations. The seat cushion structure 35, together with the upholstery thereof, defines the seat cushion of the vehicle seat 1. Springs may be effective and form a pretensioning action between the base structure 3 and cranks 33 and/or between the cranks 33 and seat cushion structure 35. The lower side of the seat cushion structure 35 is orientated in the position for use substantially downward, in a state slightly inclined with respect to the vertical. In the position for use of the vehicle seat 1, the seat cushion structure 35 and the backrest structure 4 (or the backrest carriers 8 or the base structure 3) are, for example, locked to each other or act in a positive-locking manner by means of stops or the like.

The vehicle seat 1 can be moved from the position for use into a flat floor position or non-use position. To this end, the locking devices 22 are unlocked, the locking with the seat cushion structure 35 may also optionally be opened, and the backrest structure 4 is pivoted forward relative to the backrest carriers 8 about the articulations 18. The pretensioned leaf spring 30 extends in this instance and therefore acts (as a relaxing pressure spring) in a supporting manner for this movement of the backrest structure 4. The tongue and groove guide 28 travels along its non-loaded path. When the seat cushion structure 35 is unlocked, or is released from the backrest structure in a substantially vertical intermediate position of the backrest structure 4, the seat cushion structure 35 pivots forward, in this instance by slightly more than 180°, so that the original lower side of the seat cushion structure 35 is orientated horizontally and faces upward. This movement is in this instance supported by the said pretensioning action produced by the springs on the cranks 33, that is to say, is carried out automatically.

Figure 2:
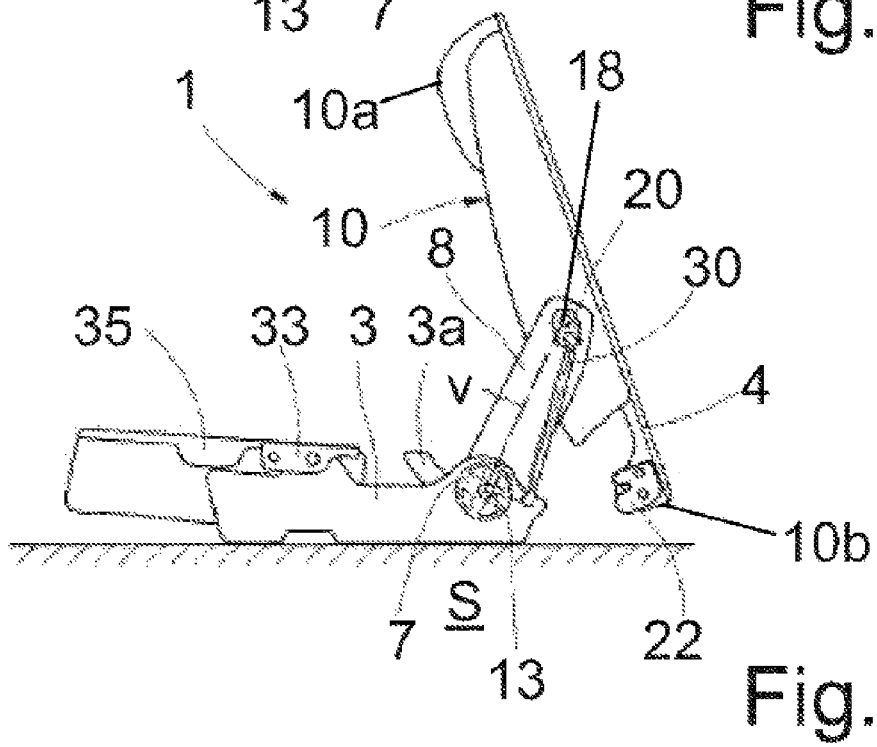
FIG. 2 is a side view corresponding to FIG. 1 in a first intermediate position during the transition into the non-use position, during the existence of the temporary four-bar mechanism.
Figure 3:
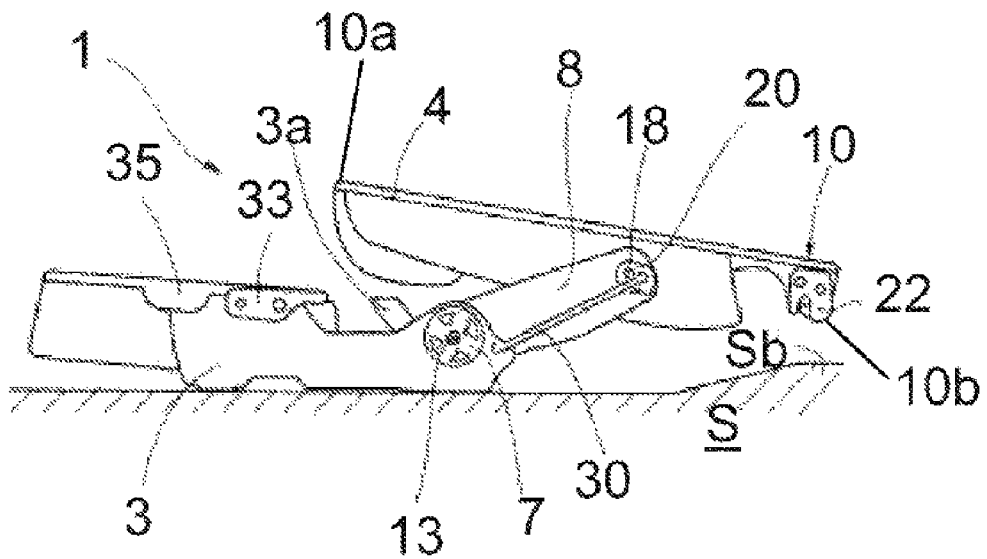
FIG. 3 is a side view corresponding to FIG. 1 in an intermediate position during the transition into the non-use position, after the temporary four-bar mechanism has been neutralized.
Figure 4:
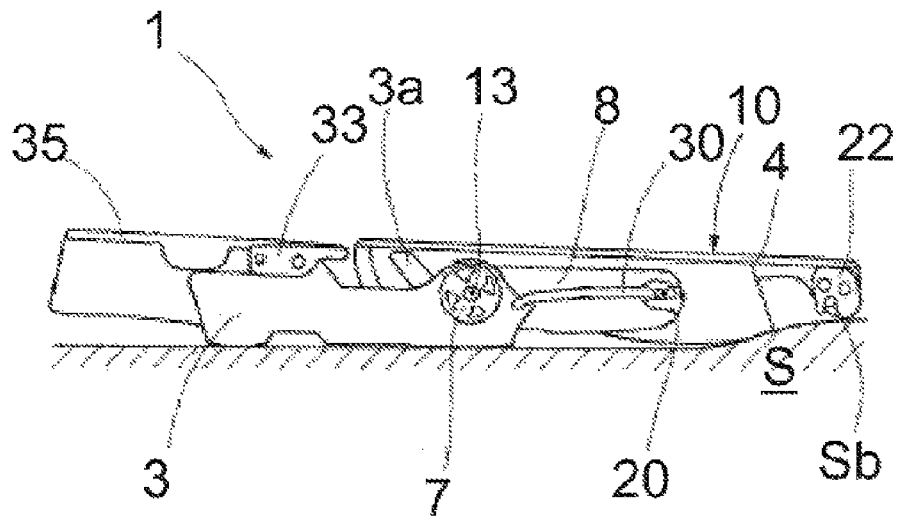
FIG. 4 is a side view corresponding to FIG. 1 in the non-use position.
Figure 5:
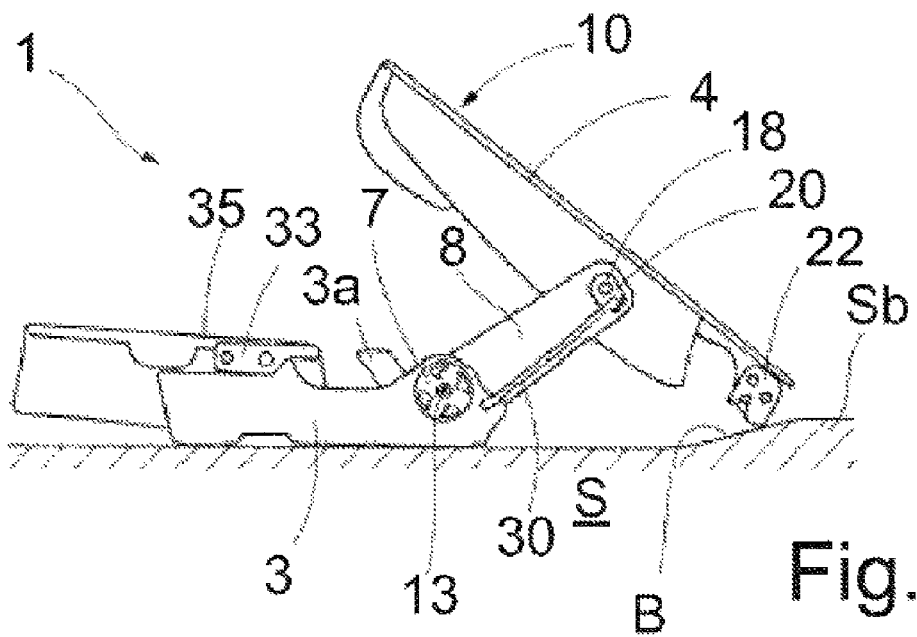
FIG. 5 is a side view corresponding to FIG. 4 in a first intermediate position when returning to the position for use.
Figure 6:
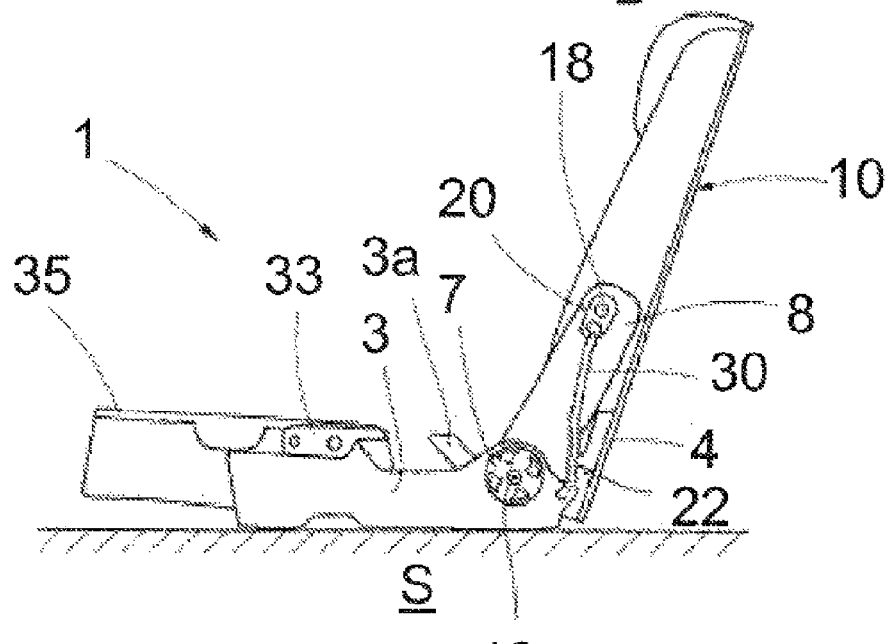
FIG. 6 is a side view corresponding to FIG. 4 in a second intermediate position when returning to the position for use.
Figure 7:
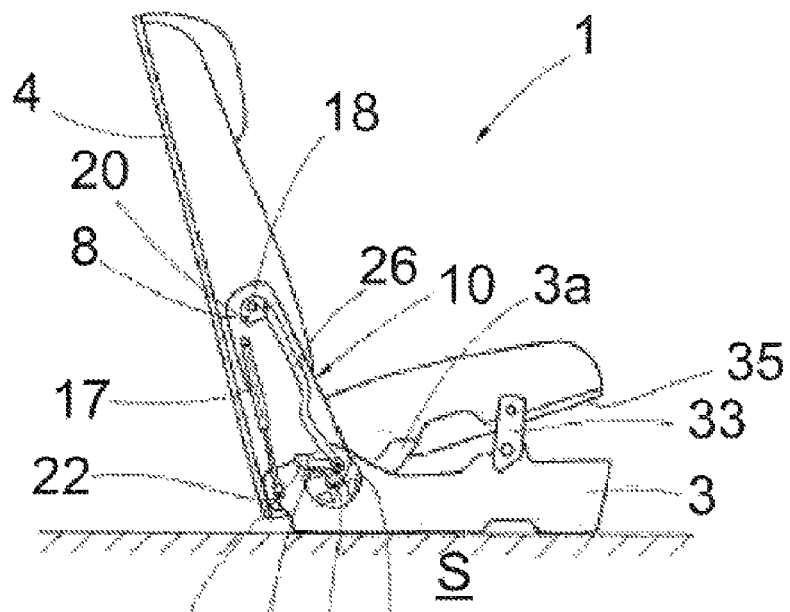
FIG. 7 is a right-hand side view of the embodiment in the position for use.
Figure 8:
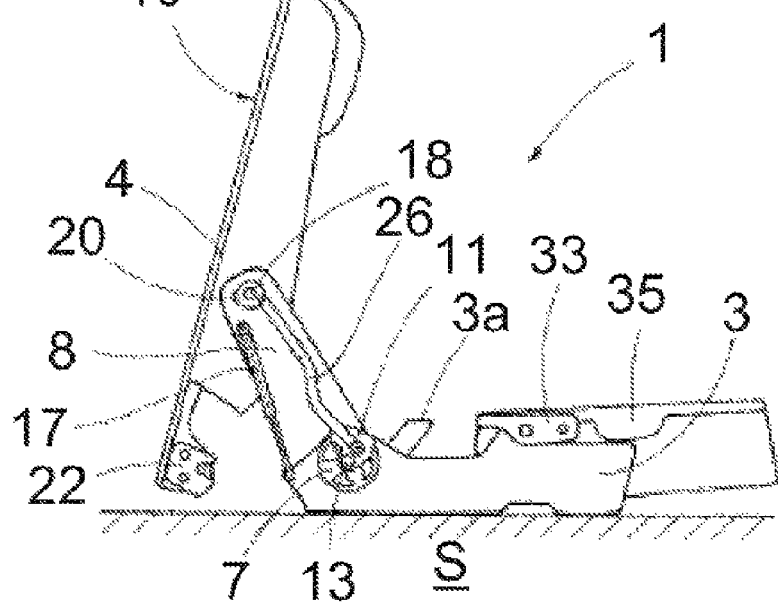
FIG. 8 is a side view corresponding to FIG. 7 in an intermediate position during the transition into the non-use position, during the existence of the temporary four-bar mechanism.
Figure 9:
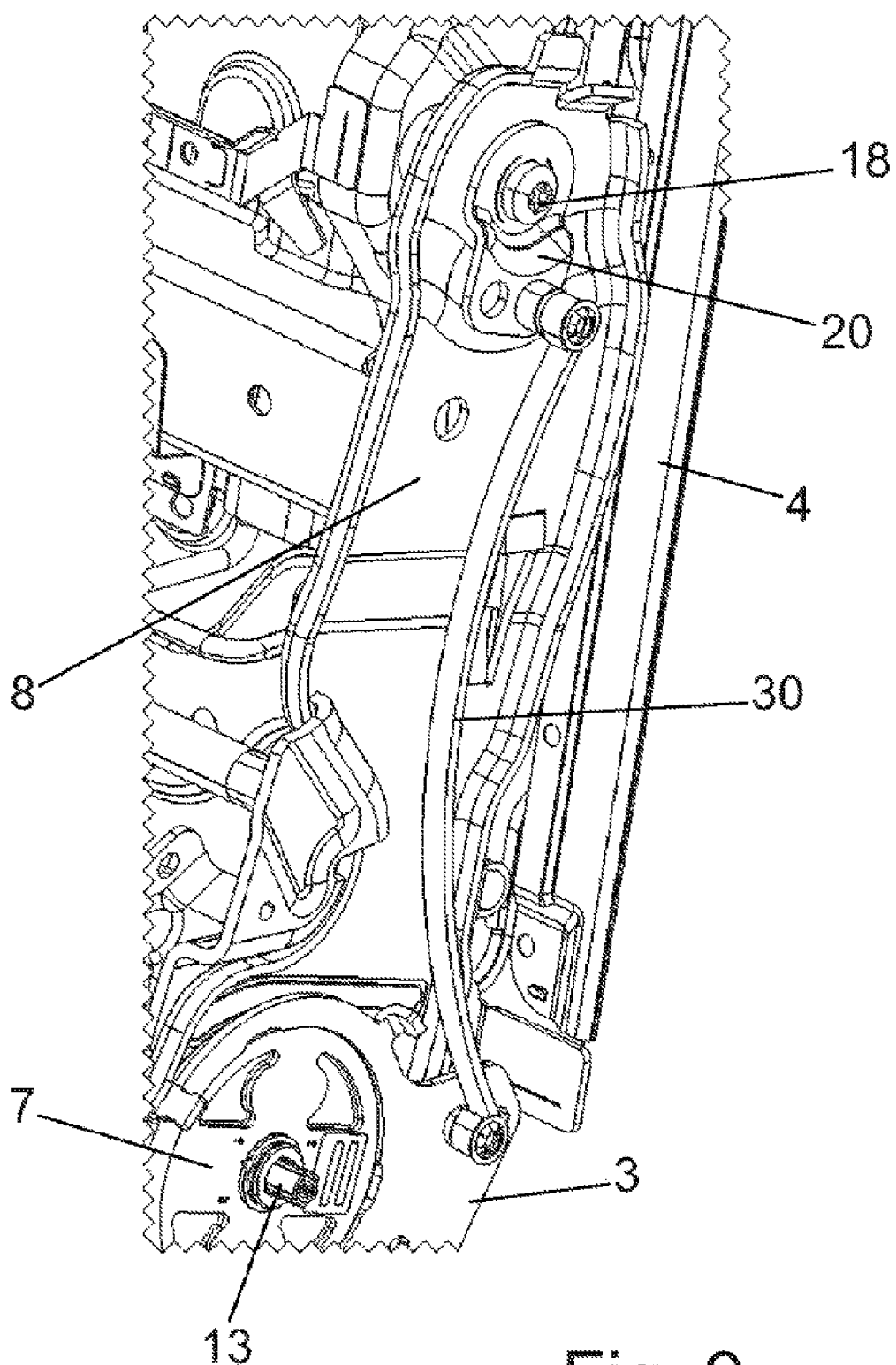
FIG. 9 is a detailed view of the embodiment in the position for use in the region of the leaf springs.

In a specific intermediate position of the backrest structure 4, that is to say, at a specific pivot angle or at least in a region around this specific pivot angle of the backrest structure 4, the non-loaded path of the tongue and groove guide 28 has been completely traveled. Now the coupling 26 entrains the first actuation element 11, whereby the fittings 7 are unlocked in a force-controlled manner (FIG. 8). Since both fittings 7 have been unlocked and the backrest structure 4 (and the backrest carrier 8) reach a specific pivot angle range, the leaf spring 30 reaches the extended position thereof (as illustrated in FIG. 2). As a result of the unlocked fittings 7, the backrest carriers 8 can be pivoted backward into the horizontal plane and at the same time the backrest structure 4 can continue its pivot movement in the direction toward the horizontal plane. In principle, this kinematic system would have a plurality of degrees of freedom.

However, a four-bar mechanism V is defined as a result of the articulation locations of the leaf spring 30, which is located in the extended position and which is loaded in terms of tension, and the articulation 18 and the fitting 7 at this vehicle seat side acting as articulations or, when viewed in another manner, the leaf spring 30, the arm 20, the backrest carrier 8 and the displacement between the fitting 7 and the adjacent articulation location of the leaf spring 30 acting as gear members. The four-bar mechanism V exists temporarily, that is to say, during the transition from the position for use into the non-use position, over the specific pivot angle range, that is to say, as long as the backrest structure 4 is located in this specific pivot angle range. The temporary four-bar mechanism V controls the kinematic system (comprising the backrest carriers 8 and backrest structure 4) of the backrest 10. The four-bar mechanism kinematic control system formed in this manner reduces the degrees of freedom of movement to a single one, that is to say, the movements of the backrest structure 4 and the backrest carriers 8 are coupled. The leaf spring 30 acts as a tensile coupling. By pressing the upper backrest edge 10a (provided on the backrest structure 4) forward, the backrest 10 can be moved backward in a downward direction. In this instance, there is no contact with the vehicle structure S. The backrest compensation spring 17 prevents uncontrolled sagging owing to gravitational force. The backrest compensation spring 17 is never located in the end stop thereof.

In the end phase of the transition into the non-use position, that is to say, when the backrest structure 4 (and the backrest carrier 8) leaves the specific pivot angle range, the leaf spring 30 bends again, that is to say, the temporary four-bar mechanism V is neutralized again and the kinematic system acts as a two-bar mechanism which is uncontrolled (or controlled in another manner). Both springs, that is to say, the backrest compensation spring 17 and the leaf spring 30 (which acts as a tensioning pressure spring) counteract gravitational force. As a result of the position of the centre of gravity of the backrest structure 4 in front of the articulations 18, the backrest structure 4 tilts forward onto the front support 3a thereof, which is formed, for example, on the base structure 3. By pressing on the rear side of the backrest structure 4 now located at the top, the lower backrest edge 10b (which is provided on the backrest structure 4) can be laid on the rear support Sb which is formed, for example, on the vehicle structure S. The non-use position is reached.

The seat cushion structure 35, backrest carrier 8 and backrest structure 4 have at least approximately reached the horizontal plane. The original lower side of the seat cushion structure 35 terminates more or less in a flush and planar manner with the original rear side of the backrest structure 4 which is located therebehind. The securing of the non-use position can be carried out by means of the inherent weight, when it is greater than the force of the backrest compensation spring 17 and the leaf spring 30, or by means of a locking action, for example, by means of the fittings 7 and/or locking devices 22 on corresponding counter-elements.

In the present embodiment, the connection line of the attachment locations of the leaf spring 30 is inclined in the preferred position for use through 23° in a backward direction relative to the vertical, pivots through 5° until the temporary four-bar mechanism V is formed, through 51° whilst the temporary four-bar mechanism is in existence and, after the temporary four-bar mechanism V has been neutralized, by a further 18°.

In order to return, that is to say, for transition from the non-use position into the position for use, the upper backrest edge 10a is pulled backward, optionally after being unlocked. The lower backrest edge 10b slides along a guiding path B which is formed on the vehicle structure S between the rear support Sb and the securing of the base structure 3 to the vehicle structure S, whereby the backrest structure 4 moves upward. The backrest compensation spring 17 supports the upward movement. The leaf spring 30 is still bent so that no temporary four-bar mechanism V is defined, but instead also supports the upward movement. The backrest structure 4 and backrest carrier 8 move as a free two-bar mechanism kinematic system in the last phase of the lifting action. The two springs, that is to say, the backrest compensation spring 17 and the leaf spring 30 are arranged geometrically in such a manner that their righting force is now significantly greater than gravitational force. Firstly, the fittings 7 lock again, then the locking devices 22. The position for use is reached again.

When changing into another position for use, that is to say, an inclination adjustment of the backrest, the kinematic system of the backrest 10 after unlocking the fittings 7 is a one-bar mechanism. The movement thereof in a forward direction is supported by means of the two springs 17 and 30, that is to say, the leaf spring 30 also compensates for a portion of the weight of the backrest 10.

While specific embodiments of the invention have been shown and described in detail to illustrate the application of the principles of the invention, it will be understood that the invention may be embodied otherwise without departing from such principles.

The invention claimed is:

1. A vehicle seat for a vehicle with a vehicle structure, the vehicle seat comprising:
    a base structure which is connected to the vehicle structure;
    a fitting; and
    a backrest which can be moved relative to the base structure, the backrest including an arm and being connected to the base structure via the fitting, the backrest and base structure defining a kinematic system including an at least temporarily active multi-bar mechanism comprising a four-bar mechanism, wherein the vehicle seat can be moved from at least one position for use in which it is possible to be seated, into a non-use position or into another position for use, wherein the four-bar mechanism controls the kinematic system, wherein a leaf spring is provided which forms, in a relaxed extended position thereof, a member of the multi-bar mechanism, and in a bent position, the leaf spring is adapted to build up tension in order to counteract a gravitational force of the backrest, the leaf spring being fitted to the base structure offset with respect to the fitting and to the arm of the backrest structure in a manner offset with respect to a backrest articulation.

2. The vehicle seat as claimed in claim 1, further comprising a locking device, wherein:
    the backrest further comprises a backrest carrier articulated to the base structure via the fitting so as to be able to be locked by means of the fitting and a backrest structure; and
    the backrest structure is articulated to the backrest carrier by means of the backrest articulation and can be locked to the backrest carrier by means of the locking device.

3. The vehicle seat as claimed in claim 2, wherein, in the position for use, the backrest structure which is locked to the backrest carrier can be adjusted in terms of inclination by means of the fitting.

4. The vehicle seat as claimed in claim 1, wherein articulation locations of the leaf spring, with the leaf spring in the extended position, the articulation and the fitting define the four-bar mechanism which is at least temporarily active and which controls the kinematic system comprising the backrest carrier and backrest structure, as long as the backrest structure is located in a specific pivot angle range.

5. The vehicle seat as claimed in claim 1, wherein the leaf spring is loaded in terms of tension during action of the at least temporarily active four-bar mechanism.

6. The vehicle seat as claimed in claim 1, wherein the leaf spring acts as a pressure spring outside an extension position.

7. The vehicle seat as claimed in claim 1, wherein in an end phase of a transition into the non-use position, the leaf spring bends and the at least temporarily active four-bar mechanism is deactivated again and the kinematic system acts in particular as a two-bar mechanism which is uncontrolled.

8. The vehicle seat as claimed in claim 1, wherein, as a result of the pivoting of the backrest structure, the backrest carrier is unlocked in a force-controlled manner, in particular by means of a coupling having an non-loaded path.

9. The vehicle seat as claimed in claim 1, wherein, when moving from the position for use into the non-use position, firstly only the locking device is unlocked and pivots the backrest structure which, in an intermediate position in a specific pivot angle range, unlocks the fitting in a force-controlled manner.

10. A vehicle seat for a vehicle with a vehicle structure, the vehicle seat comprising:
a base structure connected to the vehicle structure;
a fitting; and
a backrest comprising a backrest structure and a backrest carrier articulated to the base structure via the fitting, the backrest structure being articulated to the backrest carrier and the backrest structure including an arm connected to the backrest structure in a rotationally fixed manner; and
a leaf spring fitted to the base structure offset with respect to the fitting and fitted to the arm of the backrest structure offset with respect to the backrest articulation, the base, backrest and the leaf spring forming a kinematic system with a multi-bar mechanism comprising a four-bar mechanism active over a range of movement as the backrest is moved from at least one position for use in which it is possible to be seated, into a non-use position or into another position for use, the four-bar mechanism controlling the kinematic system with the leaf spring forming, in a relaxed extended position, a member of the multi-bar mechanism and in a bent position, the leaf spring is adapted to build up tension in order to counteract a gravitational force of the backrest.

11. The vehicle seat as claimed in claim 10, further comprising a locking device, wherein the backrest structure is locked to the backrest carrier by the locking device.

12. The vehicle seat as claimed in claim 10, wherein the four-bar mechanism, which controls the kinematic system is active over a specific pivot angle range.

13. The vehicle seat as claimed in claim 12, wherein the leaf spring is loaded in terms of tension in the pivot angle range.

14. The vehicle seat as claimed in claim 12, wherein the leaf spring acts as a pressure spring outside of the pivot angle range.

15. The vehicle seat as claimed in claim 10, wherein in an end phase of a transition into the non-use position, the active four-bar mechanism is deactivated and the kinematic system acts as a two-bar mechanism.

16. The vehicle seat as claimed in claim 10, wherein, as a result of the pivoting of the backrest structure, the backrest carrier is unlocked in a force-controlled manner by means of a coupling having a non-loaded path.

17. The vehicle seat as claimed in claim 10, wherein upon moving from the position for use into the non-use position, firstly only the locking device is unlocked and pivots the backrest structure which, in an intermediate position in a specific pivot angle range, unlocks the fitting in a force-controlled manner.

18. The vehicle seat as claimed in claim 10, wherein in the position for use, the inclination of the backrest structure, which is locked to the backrest carrier, is adjusted via the fitting.

\* \* \* \* \*